United States Patent [19]

Hill

[11] Patent Number: 5,670,574
[45] Date of Patent: Sep. 23, 1997

[54] SALT-RESIN PLASTIC PRODUCTS AND PROCESS

[76] Inventor: Joe C. Hill, P.O. Box 9024, Hickory, N.C. 28603

[21] Appl. No.: 378,382

[22] Filed: Jan. 25, 1995

[51] Int. Cl.$^6$ .............. C08K 3/26; C08K 3/24; C08L 29/04
[52] U.S. Cl. .............. 525/61; 524/405; 524/425; 524/423
[58] Field of Search .............. 525/61; 524/405, 524/423, 425

[56] References Cited

U.S. PATENT DOCUMENTS

| | | | |
|---|---|---|---|
| 3,395,206 | 7/1968 | Schneider | 264/225 |
| 3,886,112 | 5/1975 | Watson et al. | 260/33.4 R |
| 4,078,129 | 3/1978 | Yamagata et al. | 526/11 |
| 4,424,302 | 1/1984 | Block et al. | 525/58 |
| 4,472,552 | 9/1984 | Blouin | 525/61 |
| 4,600,746 | 7/1986 | Schmukler et al. | 525/57 |
| 4,612,157 | 9/1986 | Genba et al. | 264/185 |
| 5,124,363 | 6/1992 | Stern | 521/50 |
| 5,330,877 | 7/1994 | Curtis | 430/287 |

*Primary Examiner*—W. Robinson H. Clark
*Attorney, Agent, or Firm*—Cushman Darby & Cushman Intellectual Property Group of Pillsbury Madison & Sutro LLP

[57] ABSTRACT

Resin-salt plastic or polymeric reaction products are produced by reacting a resin, such as polyvinyl alcohol, with a metal salt, such as sodium chloride, in a reaction medium under agitation and conditions in which the resin does not precipitate or kick out of the reaction medium, but is solubilized in the reaction medium and reacts with the salt. The amount of salt present is at least 2.3 weight percent of the resin and is preferably added to the reaction medium in a single charge. The reaction product is separated from a mother liquor and preferably washed to remove unreacted materials and contaminants. The resin-salt reaction product, the mother liquor, and the wash liquid each have utility in the manufacture of commercially useful products.

17 Claims, No Drawings

SALT-RESIN PLASTIC PRODUCTS AND PROCESS

FIELD OF INVENTION

This invention is directed to novel plastic compositions, to articles made therefrom and to a method for forming such compositions. More specifically, the invention relates to a plastic based on a resin-salt reaction and to products which have desirable physical characteristics for further processing into a variety of commercially useful materials and which can contain fillers, acids, catalysts, plasticizers, bases, colorants, modifiers, or additions of any of these singly, or in combination.

The present invention provides novel compositions of matter comprising resin-salt reaction products which are insoluble in water. The reaction products according to the invention can be shaped by injection molding, extruding, vacuum forming, blow molding, calendaring, casting, vacuum extruding, spinning, and other plastic forming and shaping operations in current usage.

There is a continuing need for environmentally acceptable products that are economically produced from relatively inexpensive materials. The present invention is directed to such processes and products.

Following are some of the basic rules that Applicant tries to meet in practicing the present invention. These are:

1. Availability of reactants
2. Safety of use of reactant materials
3. Impact on the environment
4. Cost
5. Percent of product yield compared to feed stock
6. Energy requirements for production
7. Ease of manufacture
8. Renewable or depletable feed stock with emphasis on renewable If a process cannot meet the above eight requirements, it is a waste of the earth's resources, and will not have prolonged mass sales. The plastic product and process of the invention meets all eight.

In the present society, however, skilled persons sometimes have found it necessary to move to higher cost of production and to disregard, with as many built in safeguards as possible, the safety of manufacture, and to ignore the renewable, in order to manufacture certain limited use products that have special applications to satisfy needs of the industrial base and the world.

One can be assured, however that ignoring these fundamental rules will surely limit such products' lifetimes. The goal of the present invention is to produce the least expensive and the best products, from the most renewable sources of raw materials, requiring the least energy, and with the least environmental damage; products that will provide the most functions and the best value to the end consumer in the market place. This must be done if the products, or the world, are to survive.

An object of the invention is to provide a process to produce a resin-salt reaction product.

Another object of the invention is to provide a resin-salt reaction product having desirable and useful properties.

A further object of the invention is to provide a process for forming solid resin-salt products in which a mother liquor separated from the process can be formulated into new and useful products.

A still further object is to formulate new and useful products from a wash solution recovered following washing of a solid resin-salt product of the invention.

Other objects, aspects as well as the several advantages of the invention will be apparent to those skilled in the art upon reading the specification and appended claims.

SUMMARY OF INVENTION

According to the invention, it has been found that the addition of a salt in an amount and at a rate to a resin in solution, under agitation, such that the resin, in the presence of the salt, reacts therewith, whether the resin is modified to provide additional sites that are open for bonding or whether the resin is unmodified, or modified with salt with or without other chemicals or inert fillers, the resulting reaction between the salt and resin produces, in a short period of time, a useful plastic resin-salt product having wide applicability, and leaves a mother liquor residue, of salt and/or other chemicals, that can be recycled for further reaction into useful products or formulated with other materials into useful products.

In accordance with the invention, novel and useful solid resin-salt products are formed by a process comprising contacting, while agitating, (a) a resin having bonding sites with (b) a solution of a metal salt in an amount of at least 2.3 weight per cent based upon the resin, and under conditions of temperature and pressure which produce a solid resin-salt product and a mother liquor, and (c) recovering solid resin-salt product from the mother liquor.

In a specific embodiment of the invention, polyvinyl alcohol resin is mixed with an amount of an alkali metal or alkaline earth metal salt, sodium chloride, and at a rate such that the resin reacts with the salt to form a plastic resin-salt reaction product. The resin can be modified by the addition of ammonia and/or glacial acetic acid or other materials to provide a plurality of bonding sites and generate a higher conversion ratio of salt to resin, and to prevent re-crystallization of salts. Also, the salt can be modified by mixing with boric acid, borax or plaster of paris or other materials, or inerts such as clay, rubber residues, metals, glass powders, or rovings.

In another embodiment of the invention, the mother liquor remaining following reaction of resin with salt can be recycled to the initial resin-salt reaction zone and contacted with additional amounts of metal salt and/or passed to a separate reaction zone for contacting with additional chemicals, fillers, or intermediaries, to form additional solid resin-salt product.

In a further embodiment, the mother liquor recovered from the reaction of metal salt and resin according to the invention can be formulated with suitable additives into new and useful articles of manufacture such as coatings for industrial, commercial or trade sales, sheet goods produced by calendaring, pressurized or reduced pressure molding, casting, extruding, or by other known methods to produce vinyl sheet goods, fabric fibers, particle board, glue, and other useful products.

In still a further embodiment of the invention, the solid resin-salt product is washed with a suitable liquid, e.g. water, to remove unreacted salts or other compounds that did not enter into the resin-salt reaction, and the waste wash liquid after contacting the resin-salt reaction product is used to treat wood, fibers, sheet goods, textiles or paper to render the treated materials decay, insect, water and flame resistant.

It has been further found, according to the invention, that the rate of reaction, heat of reaction, properties of the resulting resin-salt product and the yield of desired plastic resin-salt product can be controlled by addition of modifiers selected from acids and bases to the reaction between the resin and the salt.

DETAILED DESCRIPTION OF INVENTION

The subject invention is directed to forming plastic or polymeric products from resins by reaction with a metal salt in solution, or as a dry powder or crystal, which is combined with the resin in an amount and at a rate of salt addition such that the resin, which is already in solution within a suitable medium, reacts with the salt to form a plastic resin-salt product.

Further description of the subject invention will be made primarily with respect to forming a resin-salt polymeric reaction product from polyvinyl alcohol and metal salt in an aqueous medium. It is understood that other water-soluble resins or polymers as well as other resins and polymers of solvent based composition, having bonding sites, can be processed in this manner.

Resin

The resin-salt plastic product of the invention can be produced from one or more resins, either as a single resin or a mix of several resins. These resins can be organic or inorganic, can be naturally occurring resins or synthetic, and can be long or short chain polymers or co-polymers.

The starter or reactant resins used in the instant process can be water based acrylates, vinyls, starches, sugars, cellulose, agars, or any natural or synthetic resin compatible, incompatible, or miscible with water, that contains carbon, hydrogen, nitrogen, or chlorine sites for attachment of chemical bonds. Also, these resins can be from any source and known process that forms a resin of this type when reacted under heat and pressures for a given length of time.

The starter or reactant resins can be of solvent or petrochemical nature such as urethane, epoxys, polyesters, polypropylene, etc. If desired, these resins can be the chemical constituents of such compounds that will react upon their own to form these compounds when reacted under heat and pressure for given lengths of time.

The resins can be either water miscible, compatible, or non-compatible prior to heating, but must have before heating, or after heating and mixing, bonding sites available for carbon, hydrogen, nitrogen, or chlorine bond attachment. These starter resins can be modified by treatment prior to reaction with the salt or during reaction with the salt with suitable compounds to create such required sites.

Resin Modification

In the preferred description of resin modification that follows and, in the examples, ammonia and glacial acetic acid are used, but need not be limited to these acids and bases. The preferred salt modifiers used with the metal salt are boric acid, or borax and plaster of paris (calcium sulfate), but need not be limited to these materials.

With any resin that will accept the salt addition, it has been found that larger volumes of resin can be incorporated into solution by the addition of ammonia, the amount of ammonia being dependent upon the resin of choice, and the increase in resin volume is dependent upon the resin used and the amount of ammonia the resin will tolerate.

With any resin, it has been found that by the addition of glacial acetic acid as well as ammonia, the following can be accomplished:

1. The glacial acetic acid modifies the resin to which it is added so that by the addition of other compounds having free bonding sites that can liberate hydrogen or other reactive molecules, such addition promotes the bonding of these molecules to produce a larger amount of a modified or changed product.
2. The amount of glacial acetic acid used can act as a plasticizer or as a hardener, depending on the amounts of ammonia and glacial acetic acid present, and upon the resin or resin mixes of choice, and upon the ratio of the ammonia to the acid.
3. The addition of glacial acetic or other acids, e.g., sodium diacetate, prevents or retards re-crystallization of resins that would normally revert back to crystalline form.

Good examples are sugar and sulfur. If sugar is added to solutions containing ammonia, the amount of resin which may be solubilized in a given volume of solution is increased. Without the addition of glacial acetic acid, however, the resin will, upon standing, re-crystallize, especially when larger amounts are solubilized, without the addition of ammonia.

With sulfur, which is incorporated with oil of winter green and caustic soda, the sulfur forms a hard plastic nodule. However, if ammonia and/or glacial acetic acid are present, the residual liquor does not crystallize, and can be used in a solvent based system as a vulcanizer or modifier.

With sulfur and oil of winter green, and with ammonia and glacial acetic acid and other chemical solvents, the liquid sulfur is soluble with water and will not recrystallize, which will allow the vulcanization of water based compounds.

All of the above allows the incorporation of sulfur, sugars, salts, and other crystalline substances with other resins to form new or modified plastic or resin compounds, without re-crystallization. For instance, sulfur can be used to form a new plastic that does not crystallize back to monoclinic form.

Sugar can be put into crystal clear solutions of 18 lbs+to the gallon without crystallizing, with the use of ammonia and glacial acetic or other acid, such as sodium diacetate. From this solution, new resins for paints, films, and plastics, or to modify other resins with sugar, can be produced.

Salts and Salt Modification

Suitable salts that can be used for reaction with the resin include sodium chloride (table, sea, mineral or evaporated salt), sodium carbonate, sodium bromate, sodium hydride, magnesium chloride, potassium chloride, as well as other alkali metal and alkaline earth metal salts or acids of these or other salts and mixtures thereof.

The salt, or mixtures of salts, can be unmodified or modified by treatment with various acids, bases, metals, or salts of metals. The catalysts or plasticizers are mixed with many inert fillers or reactive compounds, or with other resins, wet, dry, or in solution, that can themselves be modified with other chemical additives or colorants. The salts can be mixed with all dry chemical additives, or can be a slurry of salt and liquid additives, or can be in a solution of salts and additives.

The salt can be modified prior to contacting with the resin or during contacting with resin in a suitable reaction medium, while under mix.

A typical example of a salt mix that can be used is sodium chloride, boric acid or borax, and calcium carbonate or calcium sulfate.

The addition of boric acid to a salt solution, and the addition of the resulting salt/acid mix, either dry or wet, to the reactant resin results in a reaction occurring and the formation of a resin-salt plastic mass. As the salts are added to the resin of choice, in the ensuing reaction, the reaction rate is greatly accelerated by the boric acid, so that the plastic produced does not incorporate all of the salt or salts.

The boric acid or borax is used to control the speed of the resin-salt reaction, and also to alter the hardness of the resin-salt plastic product. If too little boric acid is added, the final plastic product is soft, and if too much boric acid is added, a granular resin-salt plastic product is produced, with low yields and considerable amounts of unreacted salt.

If the boric acid is combined with calcium sulfate, the calcium sulfate acts as a sequestrant on the boric acid reaction, and by varying the amount, in relation to the salt, of boric acid and calcium sulfate, the rate of reaction, heat of reaction, hardness and softness of the resin-salt plastic product and the yield of resin-salt plastic product can be controlled.

Resin-salt Reaction

The mix procedure and reaction of resin and salt comprises the addition of massive amounts of salt of at least 2.3% or more, wet slurried or dry, or in solution, to resin or resin mixes being agitated in a fast charge in relation to the resin. The amount of the modified or unmodified salt or salts is dependent on the resin and the modifiers used with the salts, but, if the salt is added at once in, an amount of at least 2.3 percent and up to 800 times the resin weight of the volume solids of the resin in solution, the resin-salt plastic is produced.

The amount of metal salt combined with the resin and the rate of addition of metal salt is controlled such that the resin is reacted in the reaction medium with the metal salt, and reacts with the resin to form the resin-salt plastic product.

One can take a salt or mix of salts, wet slurried or dry, modified or unmodified with other chemicals, and add to the resin by any means while under mixing, the modified or unmodified resin or resin mixes. The modifiers can be other chemicals or compounds, inert, or reactive to the salt or salts.

All of the above can be performed under heat and pressure, or in vacuum, depending on the resin and salts used and the modifiers, or can be performed at ambient temperature and atmospheric pressure, again depending on the resin and the salts and their modifiers, and depending upon the quantities and qualities sought for the end product.

The solids in solution can vary from a low of 5 percent to a high of 99 percent solids in solution of resin. Art example of high solids would be a polyester with a reactive monomer solvent, such as styrene modified with ammonia and glacial acetic acid.

As a carrier dilutent or solvent or as part of the resin-salt reaction, the carrier dilutent can be water, hydrocarbons, catalysts, esters, amines, alcohols, ketones or reactive solvents such as styrene monomers, polyvinylpyrrolidone, and others, or mixes of other solvents, or other monomers.

The salt or salts can be of wet slurries, salt solutions, or dry prior to addition of modifiers, and prior to addition to the resin.

Dry materials must be thoroughly mixed and ground or crushed to a finely divided state to obtain maximum reactivity or miscibility when added to the resin. However, the salts can be used in normal crystalline form without crushing or grinding.

The resin, or mixtures of resin and solvents, can be reacted with the salt in open vessels or in closed retorts or resin cookers, or in various mix machines such as cowles, banberry, or doughboy mixers, either under pressure or at normal atmospheric pressure, or in a vacuum, with or without heat.

The metal salt can be added to the resin batch in one massive dump, injected in a steady stream, or drawn into the resin under vacuum, while the resin in a suitable reaction medium or dilutent is under agitation or movement brought about of any means, or, if desired the resin can be added to a reaction medium containing the metal salt.

The temperature of resin-salt reaction can vary from say minus 200° F. to elevated temperatures of up to 2000° F., and the pressure can be from vacuum to several atmospheres, for example 10 atmospheres, depending on the resin, the salt and resin modifiers, the salts, and the degree of modification of the salts. These modifications result in various types of products.

The lower the heat of reaction, the slower the reaction will proceed, due to the slow movement of the molecules within the reaction. Thus, variations in temperatures can, from a given formulation, produce variations in the properties of the resin-salt end product.

Low temperature reactions are limited only by the freezing point of the reaction medium, and resins or modifiers used, and the economics of low temperature production.

High temperature reactions are limited only by a function of one of the following:

a. The temperature at which a given reactant begins to degrade into its primary components, or becomes another entirely different compound.

b. The temperature at which the reaction becomes exothermic, resulting in a useless charred resin-salt reaction product or one which cannot be converted back to flow by heat, or which cannot be solvated by economical means and common solvents, even under temperature and pressure.

Limitation of pressure is dependent on the theoretical limit of the reaction chamber, which is a function of the vaporization point of the chemicals and solids used in the reaction, and the pressures generated at a given temperature by vapor pressure of the reactants. It is also contingent on the vessel's size, strength of the material from which it is constructed, and the amount of chemicals with which it is charged.

The ratio of resin to salts must be carefully observed, and the additive amount of at least 2.3 weight percent salt based on resin present must be at a fast rate or a fast metered controlled rate. The speed of combining the resin and salt is governed by the amount of salt, either dry or in solution, modifiers of the resin and salts, the temperature of the resin and salt solution, and the desired product and yield. There must be a constant addition of salts and modifiers to the solution in which the resin is being reacted in a ratio sufficient to replace the reacted salts and modifiers. The reaction solution must be kept under agitation or turbulent flow or movement to expose the largest number of molecules of resin to the salts.

The resin-salt polymeric product formed according to the invention can be removed from the reaction zone and formed into useful products without further processing. However, if desired, the polymeric product can be washed to remove unreacted materials and impurities and yield a useful wash solution and the washed resin-salt product can be formed into useful manufactured products described in detail hereinafter.

Removal of the resin-salt polymeric product from the reaction mass in the resin-salt reaction zone leaves a mother liquor, which in itself, possesses desirable properties for forming into useful manufactured products or for further reaction with additional salt and/or resin.

Mother Liquor

Following recovery of the resin-salt polymeric product from the reaction mass in the resin-salt reaction zone there remains 10 to 80% of the initial volume of the reaction mass as mother liquor which comprises the reaction diluents or solvents, unreacted salts, unreacted resin, and other materials present during the resin-salt reaction that did not enter into the reaction. The amount remaining is dependent on the resin used, and the amount of salts added in relation to the resin.

This mother liquor can be recycled to the initial reaction zone for further reaction, with another charge of salt. More resins, modifiers, or other compounds may be added prior to another charge of modified or unmodified salts, or used as such in the manufacture of other useful manufactured products. The mother liquor can be marketed as a liquid for further use, converted into a reversible gel or a reversible semi-solid gel, or converted and held as a solid which can be shipped for further processing as desired.

As an alternative, the mother liquor can be made synthetically by the addition of small amounts of a salt and other reactants to certain starter batch formulations, in the same percentages as are contained within the mother liquor.

This synthetic mother liquor reaction will invariably produce some resin-salt reaction product, which can be separated from the mother liquor and utilized, while the remaining mother liquor (90–95%) will be equivalent to the mother liquor that remains after removal of the resin-salt reaction product from the reaction mass in the original process.

Use of Mother Liquor

The mother liquor can be used to produce many products including coating compositions, such as paints. The mother liquor can be combined with conventional coating formulation components.

The paint products can be produced by the addition (to the mother liquor) of plasticizers, solvents, extenders, flow additives, pigments or dyes, dryers, catalysts, photoinitiators, or a combination of these items as well as other chemicals or compounds currently used in the paint or coating industry.

From these compounds, one can produce a varied assortment of trade or industrial sale items, such as sealers, washcoats, primers, stains, glazes, wiping stains, fill stains, fillers, no-wipe stains, in clears or in colors, for air drying, or heat or other reactions involving energy or catalytic compounds to promote cure.

Inert fillers or extenders, pigments or dyes, or other chemicals or solvents, can be incorporated with the conventional methods now employed in the coating industry to compound existing formulations.

The coating formulations can be used with any substrate including paper, book, box, and wallcovering industries, or can be used to coat plastic, glass, metals, woods, rubber items, masonry products, roofing products of foam or asphalt, any synthetic or naturally produced wall board, or many other items used in construction, or for decorative purposes.

The coating formulations can be applied to the substrates to be coated by the use of any equipment or process now used in the coatings industry to apply coatings, such as by brushing, dipping, spraying, rolling, rollcoating, or curtain or electrostatic, and the like, either by one method or a combination of methods.

The mother liquor in a solvent or aqueous base can contain up to 30 percent solids, which, by evaporation in a vacuum can be raised to 50 percent solids. This evaporation can be accomplished at temperatures of less than 185°. The evaporation only removes excess solvents in the same ratio originally incorporated, with the exception of unreacted ammonia, which is totally removed and, if needed, must be replaced before start of the next process step, or recovered by being refluxed back through condensate coils. The ratio of removal depends on the volatility of the solvents. The higher boiling solvents will vaporize at high temperatures, and the low boiling solvents will remain, unless an azeotrope is formed with the water, resin, or other solvents.

The mother liquor can be used to produce textile fibers that can be spun into fabrics. The fabric threads or yarns can be produced from modified condensed mother liquor, using any current technology, such as wet or dry spinning systems, acid solvent systems, acid water systems, caustic systems, or a combination of these chemical treatments, and can be accomplished with heat or cold treatments, through spinnerettes, by slit extrusions, or by any process now used.

By a process of evaporation, fibers can be formed. The fibers can be formed to be elastomeric, hard, soft, flexible, rigid, brittle, glossy or flat, clear or colored, flame resistant, water, solvent, or acid resistant, as webs, and flat, round, or in various other shapes. The fibers can be precolored, or spun clear for subsequent dying.

To achieve different properties or textures, the textile fibers can be further compounded with acids, caustics, or solvents, treated hot or cold, or altered by extrusion by mechanical means into various treatment baths of solvents, either acid or caustic, or by drawing, pressure, or vacuum.

These fibers can be foamed (as in particle board foaming) to create a light weight fiber for insulation or flotation purposes.

The mother liquor can be used in the manufacture of plastic pipe and hose, sheet goods, or in the extrusion of other useful products or by another process for the production of explosive products.

The mother liquor as well as the resin-salt reaction product, can be used to make building blocks or cast prefab buildings or components of buildings, curbs, gutters, pipes, walls, slabs, roofs, trusses, streets, highway bridges, or sculptures, or any needed commercial, industrial, or residential construction item and other component parts for many industries.

By mixing the mother liquor with sands, silica, sawdust or wood chips, clays, earths, or other inert materials or reactive compounds, such as other resins, one can form blocks cemented together by the resin, and the end product will be composed of 20 to 50 percent mother liquor, and may or may not have additional salt or salts added. If additional salts must be added to the mother liquor, these can be added in quantities up to 50 percent, as a slurry or as dry salt, to the dry inerts or incorporated into the mix of mother liquor and inerts or added to the mother liquor prior to its addition to the inerts.

After mixing, these products can be cast and cured in any form and size, the only restrictions on form and size being shipping restrictions. To overcome shipping restrictions, the mother liquor may be shipped to the construction site, intermixed there with the inert components, and poured into forms on site.

New bridges, streets, and highways may be constructed entirely of these products, or existing structures can be skim coated with 1 to 4 inches of this product. Either way, the products can be formulated with enough residual salt to prevent freezing ice from forming.

Resin-Salt Product Purification

The resin-salt polymeric product obtained according to the invention is usually washed with a suitable liquid before further use and processing. Any suitable wash liquid can be used so long as it is not detrimental to the properties of the resin-salt polymeric product. The wash liquid will normally be water, which is the most cost-effective wash medium. However, other wash liquids can be used such as the solvents and modified solvents described previously.

After contacting the resin-salt polymeric product with a wash liquid, the wash water or wash solvent waste, or a mixture thereof, will have in solution residual traces of unreacted resins, salts, metals, acids, plasticizers, or extenders that did not enter into the primary reaction between the resin and salt.

Uses for Wash Liquid

This washoff water or solvent waste can be utilized as follows:

1. If not needed for other purposes, it can be returned to, and incorporated in, the next batch of wash liquid, or to the next reaction of resin.
2. Additional salts, acids, and other compounds can be added to create products to pressure treat wood, fabrics, paper, and other substrates to make these materials non-flammable, decay resistant and insect resistant.
3. Additional solvents, acids, metals, catalysts, etc. can be incorporated into the wash solution to provide a setting bath for the extrusion of plastic, to form fibers, or to improve shell strength.
4. Distilled down to remove water, condense solids, and recover solvents. Then:
   A. The recovered solids can be ground, and added to a salt mixture to make a new resin-salt product.
   B. The recovered water free of other components or contaminants, if not needed for other batches, can be used for irrigation.

Utility or Resin-Salt Plastic Product

The resin-salt polymeric product of the invention can be, either prior to washing or after washing, may be calendared through rolls into desired shapes of various thicknesses.

The base resin-salt polymeric product of the invention can be poured and pressed into molds of from ⅛ inch thickness, to 60 inches thickness. Depending on the density and final use to which the products will be used, the products can be made with or without pressure, and with or without heat. The product can be cured with or without heat for use as commercial, residential, or industrial construction parts, such as interior walls, exterior walls, wall paneling, doors, floors, roofs, decks, etc. The only restrictions on size and shape are imposed by weight and size restrictions for shipping; in fact, at the plant site, the product can be stacked or extruded to form large stacks for storage of unshipped production.

In the case of interior or exterior walls, the product can be cast in sizes of 14 feet in width (this is the widest permissible widths for transportation by trucks on the Interstate Highway System), one to sixty feet in length, and ⅛ inch to 60 inches in thickness. These products can be engineered for prefabricated construction with plumbing and electrical imbedded within the walls. Floors, windows, and door openings may be pre-cut, or cut after erection at the site. Reinforcement materials can be used if required. Such reinforcements can be in the form of sheets of fiberglass or other suitable materials, or can be steel or wood members imbedded within the wall, ceiling, or roof.

The product is highly insulative, non-flammable, with a high degree of tensile strength, thus capable of large clear span support.

The resin-salt plastic product can be molded to resemble:

A. In the case of exterior walls, the product can be molded to resemble stucco, brick, stone, log, or siding. The walls can be foamed interiors with hard shells, or hollow core shells, or solid. They may be opaque, or they can be translucent to the degree required for admittance of light. The product can be designed for the entrapment or conservation of heat, either natural or artificial. The walls can have imbedded within their matrix either radiant light or heat sources.

B. interior walls can be made to resemble plaster or sheetrock, and can be wood grain printed and finished, or marble silk screen printed and finished, or finished by any method currently used to finish sheet rock or plastic. The products may be embossed, printed, or can be finished natural, wallpapered, or finished as a solid mirror. The panels can be hollow core, foamed, solid opaque, or translucent. The walls can have electrical, heating, cooling, or plumbing ducts imbedded within, as well as radiant heat or light sources.

C. Roofs can be molded to resemble tile, roofing, asphalt shingle, cedar or wood shingles, or smooth solid slate. Colors can be molded in, or applied later and can be hollow core formed, foamed, or solid sheet, and can be molded in many and various shapes. These can be translucent for the use of natural light, or may be imbedded with radiant heat or light sources.

D. Ceilings can be molded to resemble acoustical tile, cellutex, wood, paneling, plaster, or sheet rock and can be painted or papered by conventional methods, or can be finished as a solid mirror. The products can be translucent or opaque, and can contain imbedded radiant heat or light sources.

E. Floors can be molded to resemble marble, slate, tile, or embossed or printed wood grain and can be translucent or opaque, or finished as a mirror, or buffered and finished with polished high gloss colors. The floor can have radiant heat or light sources imbedded, and can have heat or cooling ducts molded in place. The floors can be installed as natural resin-salt products, or with any conventional flooring installed over them, such as hardwoods, tile, marble, slate, or carpet.

The products can be shipped as panels of ⅛ to 60 inches thickness, or can be molded into any shippable size. The panels can be assembled by crews on the construction site, and can be joined together via nailing, gluing, heatbonding, or screwing. They also may be joined by hot melt adhesives, by pre-engineered nuts and bolts, and by interlocking channel construction. Window and door openings can be pre-cut or cut on site after erection.

The resin-salt reaction product can be in washed or unwashed form and then formed into useful manufactured articles. It can be extruded into construction beams and studs of any shippable length and size, such as I beams 2 inches to 60 inches thick, 4 inches to 100 inches in height, and are limited in length and size only by shipping lengths and weights, and by the capacity of the reaction vessels, and the size of the molds or extrusion machines.

Beams, studs, and I beams formed from the invention products can be used as conventional construction members, and can replace 2" by 4" studs, or, when formed into trusses, can support long clear span construction. The beams can be used in high rise construction, for bridge trusses, or in large clear span industrial buildings.

The beams can be used in conjunction with conventional construction of steel, concrete, and wood, and can be used with panels, sheets, or slabs formed from the resin-salt reaction product, or with conventional building materials. These products may or may not be reinforced with wood, metal, or sheets of reinforcement materials, or other plastics of natural or synthetic origin and can contain extenders, depending upon the use to which they are put.

Depending on the architectural and engineering requirements, all items can be molded, cast, stamped, or extruded into many varied shapes, i.e., round, curved, domed, angular, flat, convex or concave, or other complex shapes, for molding or design purposes.

Resin-salt polymeric product that has been washed to remove all unreacted particles or chemicals can then be extruded, or calendared into flakes, chips, or pellets, strips, or sheets, and bagged and shipped to compounders as follows:

1. Used by extruders, molders, and casters to produce products, either with or without other solvents, or with or without heat or pressure, and with or without extenders, colorants, plasticizers, or other additives or reinforcement materials.
2. The refined polymeric product can be used for extrusion, injection, calendaring, drawing for filaments, spinning (either wet or dry) into fiber, coating compounds for cable wire, thermoforming, blowmolding, vacuum forming, or compounding into coating other films.
3. Cast at the construction site, using suitable equipment, into slabs, walls, drives, pools, curbs, paving, or roofing material.
4. Extruded, in a liquid state, under seawater for tunnels, domes for mining or farming, for habitats in which to live and study, or for oil and gas exploration. Can also be extruded around transatlantic or transpacific cables as they are laid, or around wood or metal pilings as they are driven in ocean, river, or lake beds.

The resin-salt product of the invention has many other commercial applications. For example, the resin-salt products can be used to recover oil, gas or water from wells that have been capped or abandoned because of zones of salt or fresh water intrusion, loose zones of sand or gravel, porosity, or fractured zones, or from wells that have lost production. In addition, the resin-salt product can be used in saving wells currently being drilled, to seal off contaminated zones of toxic or chemical nature from fresh water zones that supply drinking water.

The resin-salt product can be used to fracture a zone, to seal off a porous zone before attempting to restore a vacuum, or to create pressure within a specific zone.

The resin-salt plastic product of the invention can be used together with bacteria in the vacuum recovery of oil. After sealing an oil or gas well with resin-salt plastic and establishing an air tight plug:

Inject into the hole a genetically engineered Aerobic or Anaerobic bacteria, of which several strains have been developed.

These bacteria, left unmolested, would multiply and begin to eat the oil deposits, thus releasing vast quantities of methane gas.

The production of methane gas would facilitate the flow of oil and gas whenever one re-drills through the plastic plug and pull a vacuum. This step would be done only after the bacteria is given sufficient time to eat the oil deposits.

In an oil field, the bacteria could be injected into wells around the perimeter of the proven reserves, and the resulting gas would force oil to the center of the field for vacuum extraction of oil, while the perimeter wells could become highly productive gas wells.

After complete depletion of the well or wells, the bacteria could be killed.

Resin-salt plastic plugs and bacteria can also be used to recover additional oil from water pushed wells that are to the point of depletion because of the water out weighing pushed oil to the point of being impracticable to separate, by:

By injecting bacteria into the oil/water mix below a resin-salt plastic plug, the resulting created gas would force oil and water intermixes apart.

This would enable further extraction of oil through the plug via vacuum, as oil is floatable on water and as the creation of gas pressure in the zone would provide a push against the water and oil, because oil and water are not miscible and would be pushed apart by the formation of gas above the water, even if only 0.010%.

Once the maximum oil and gas recovery is achieved, then the bacteria could be killed.

Resin-salt plastic can be used also to contain zones of pollution, where large deposits of fresh water have been contaminated by oil, other toxic hydrocarbons, waste, or other bacteria. If a strain of bacteria can be genetically engineered to eat the contained pollution, such bacteria can be injected into the zone of pollution, and the fresh water can be recovered. Then the bacteria could be killed.

This process should not be used on interconnected fields or strata; only on proven reserves with known parameters.

The resin-salt product can be used in recovering oil from land and sea spills.

When a massive oil spill occurs off shore in medium to calm seas, the oil spreads very quickly, the resin can be modified to react and foam with salts, and by injection below the surface or by a spray application to the surface, the resin can be delivered by plane, helicopter, or ship, can form a foamed floatable containment boom around the spill, thus encircling the oil.

Later, from plane, helicopter, or recovery ship one can lay down a heavy film of heavily modified resin and modified salt solution, and react it with the 2.3 percent salt of the sea to form:

1. This resin can be modified to form a sinkable plastic sheet that entraps the oil and sinks it to the bottom for gradual dispersion over a period of years, or
2. One can engineer the resin to form a floatable foamed layer of resin-salt plastic for hoisting aboard the recovery ship, where oil and water can be extracted from the foam through rollers.

Chemical washing of the foam with hydrocarbon such as naphtha, toluene, xylene, or benzene as the wash solvent of choice would not be critical as the recovered oil must be refined, and such process would remove and separate most of the oil from the sea water or wash solvents.

The process for oil cleanings on land is similar to the method employed at sea for oil spills, except on land, it is carried out as follows:

1. A light or heavy weight foamed dike of resin-salt plastic is constructed to the height necessary to contain the liquid in a given area.
2. A reactive resin is salt modified or resin modified to form a resin-salt product which is sprayed into the pool of oil or fluid, and by mixing the spray and the contaminate, and adding either salt or resin, depending on which was used first to mix with the spilled liquid.
3. When the reaction has formed a thick heavy mass that is extractable by lifting or pumping, the mass may be lifted in sections or as one piece, and passed through heated rollers to extract the contaminate, solvent wash, or oil. The earth can be mixed to a depth of a few inches or up to several feet at a time, and removed until a clean level is reached. The lifted mass is encapsulated as a resin-salt block that locks the contaminant into the mass. The mass can then be disposed of in land fills or at sea, or used as building blocks, or by using heat and chemicals, the contaminant could be extracted.

The present process can be used in the disposal of municipal sewage and garbage as well as sewage/garbage disposal on ocean going ships, barges, drilling rigs, and the like. The plastic mass produced is bio-friendly to the environment, can be engineered to decompose at a given rate, and in the meantime can become a rich source of growth for marine animals and species of coral and sea weed, depending on the depth at which it is dropped. Other chemicals to control insects or weeds can be incorporated into the plastic, and due to slow release into the soil, may be less harmful to the environment, while providing a controlled time release fertilizer.

Also, the resin-salt product can be used to encapsulate noxious materials which are difficult to dispose of or store.

Any of the resin-salt plastic not used for other purposes can be sunk at sea, without harm to the environment:

1. To provide breakwaters to harbors
2. To protect beach fronts and shorelines
3. To foster marine growth of coral and other life forms
4. To provide docks and piers that are replaceable One can engineer the resin-salt plastic to decompose at certain rates. Meanwhile, in the case of sewage, it is sterile and has all the now inert materials locked in place for slow diffusion over a two to fifty year period. It can in the meantime provide a habitat for new marine life of fish, lobster, and other species.

The resin can be designed to decompose at a given rate, and the other additives will be harmless additions to the sea, and can even provide nutrient rich seabeds for seaweed and algae to thrive on, as they slowly release the concentrated sterile sewage.

Resin-salt plastic or mother liquor can be used for the construction of bubbles or domes under the surface of the sea for work, study, or living quarters. Or it can be used for tunnels or pipe lines.

This can be accomplished by injecting a layer of reactive resin between a top layer of reactive salts and a bottom layer of reactive salts with air, through a triple walled tube, into a short containment or mix tunnel to start the reaction.

The resin-salt plastic can be used to dispose of hazardous chemical or radioactive wastes, or harmful metals, acids, gases, or hospital waste liquids or solids.

Contaminated liquids of any type may be neutralized before contacting with the resin or salt. The liquid is then modified or slurried with salt so that both are reactive with the resin. Inert fillers can be used, if needed, to provide solids weight.

SPECIFIC EXAMPLES

The invention will be illustrated further by the following examples.

Example 1

Preparation of Resin-Salt Plastic

In a 10,000 lb. base resin batch, the base formulation consists of:

6,700 lbs. of water 2,500 lbs. of poly vinyl alcohol (water soluble) (PVA)

300 lbs. of glacial acetic acid 500 lbs. of ammonia (anhydrous 37 percent)

Instructions

First, disperse 2,500 lbs. PVA in water at a temperature below 150 degrees Fahrenheit, under agitation once in dispersion, and solvate to the maximum extent. Next, add under vigorous agitation, 300 lbs. of glacial acetic acid. Then disperse into the solution, 500 lbs. of ammonia.

Caution:

a. The reaction between the ammonia and the glacial acetic acid is exothermic, and produces clouds of white gas.

b. All glacial acetic acid should be thoroughly mixed into solution prior to addition of ammonia.

c. Sudden temperature or pressure changes can occur.

d. Avoid inhalation of gas with proper containment vessels, masks, and ventilation.

In a 10,000 lb. starter batch, this reaction, when completed, gives a real solids content of 28 percent and a theoretical solids content of 25 percent. The difference of 3 percent solids between the actual and theoretical, when checked by drying and weighing, is attributed to the ammonia and glacial acetic reaction with the PVA resin.

Example 2

Preparation of Resin-Salt Plastic

In a 10,000 lb. starter batch of water, PVA resin, salt, ammonia and glacial acetic acid, reflux back through the condenser distillate column, to the batch, as the temperature is raised from 150 degrees to 210 degrees. Part of this temperature rise is accomplished by the exothermic reaction between ammonia and the glacial acetic acid.

Then, to the above, add at 210 degrees under heavy agitation, the following:

6,000 lbs. of sodium chloride (Na Cl)

20 lbs. of boric acid ($H_3BO_3$)

200 lbs. of calcium carbonate ($CaCO_3$) or 200 lbs of calcium sulfate ($CaSO_4$)

The above dry solids should be premixed and ground to a grind of 6 plus on a grind gauge, or through filters in a ball or roller mill, or crusher.

The entire charge of ground dry solids is dumped in at 210 degrees, as quickly as possible, while maintaining heavy agitation. A heavy white resin-salt plastic mass forms at once.

The entire contents of the reactor vessel then should be discharged into a separator and the mother liquor is extracted from the mass and decanted off.

At this point there is approximately:

10,000 lbs. of unwashed wet resin-salt plastic 6.000 lbs. of Mother Liquor

The plastic mass then should be washed with hot water at 120 degrees, and squeezed of all excess liquid, which is decanted off.

Total yields and waste at this point consists of:
1. 9,000 lbs. of semi-wet resin-salt plastic containing the following approximate amounts:
   5,500 lbs. of salt
   1,500 lbs. of PVA
   150 lbs. of calcium carbonate
   10 lbs. of boric acid
   1,940 lbs. of water, ammonia, glacial acetic acid, in whatever proportions that entered into the reaction to form new compounds with the PVA and the salt. This is the wash water for the plastic to remove any unreacted compounds.
2. 6,000 lbs. of Mother Liquor, of 21 to 25 percent solids, remains after removal of the plastic mass. This Mother Liquor contains:
   900 lbs. of PVA
   420 lbs. aqueous solution consisting of glacial acetic acid, boric acid, calcium carbonate or calcium sulfate, and ammonia.
   200 lbs. of salts
   4,480 lbs. of water, with all the above in solution After squeezing the plastic mass to remove mother liquor, and washing with hot water to remove residual materials, there is 8,000 lbs. of plastic mass, which, after squeezing to remove the water wash, is ready for casting into molds for prefabricated building components, or extruded into structural members,—calendared into sheets of desired thickness and dried later in molds, or it may be dried and ground, chopped, or flaked for shipment to customers for further processing.

3. 2,500 lbs of waste water washoff liquor, which contains 100 lbs. of PVA plus salts, calcium carbonate, boric acid, ammonia, and their reaction products.

The following products were obtained:
7,000 lbs. of dry resin-salt plastic ready for shipment
6,000 lbs. of Mother Liquor
2,500 lbs. of waste wash-off water Example 3

Production of Particle Board Using the Mother Liquor

Particle board can be made by the following methods, after first condensing the mother liquor to 3,000 lbs. of approximately 50 percent solids to shorten the dry time of the board. The condensate can be stripped and reclaimed.

Method One

1. To 3,000 lbs. of condensed Mother Liquor (1,500 lbs. of solids), add 500 lbs. (ratio of 3 solids weight of Mother Liquor to 1 solids weight of wood matter) of wood chips, dust, or fibers, under heavy compounding.
2. At 185 degrees, add 100 lbs. of ammonia. Reflux the condensate back for 15 minutes at 185 degrees, under heavy compounding.
3. To 1,000 lbs. of waste wash off water, add:
   a. 200 lbs. of sodium chloride
   b. 50 lbs. of calcium carbonate
   c. 10 lbs. of boric acid
4. Combine the mixture from step 3. into the Mother Liquor/wood mixture from steps 1. and 2., in one fast charge and mix until thoroughly dispersed. The reaction will go slightly exothermic.
5. Discharge into molds the amount of the mixture needed to achieve the desired thickness and density, and press out and decant excess fluids.
6. Press at appropriate pressure, for the desired weight, density, and thickness of the board.

The yield will be approximately 2,500 lbs. of conventional board.

The molds can be heated to 185 degrees, in which case the product can be removed from the mold in three minutes. If the molds are not heated, the product can be removed in 15 minutes and still retain its shape with only a slight loss of density, which can by varying the thickness of the mold and amount of mixture used retain both thickness and density.

Method Two

Method two is used to make acetate, polyester, urethane, or acrylate boards, or board of other resin mixtures.

In this example, the PVA Mother Liquor can be converted to a vinyl acetate binder for making the same board as in Method One, with only slight changes. The acetone, glacial acetic acid, and ammonia, work to break down the structural compounds of lignen and cellulose in the wood into a sticky glue of acetate type quality with residual salts which inhibit flammability.

1. Same as step 1. in Method One, except that 100 lbs of glacial acetic acid is mixed thoroughly into the wood matter.
2. When the ammonia is added in step 2., the reaction will exotherm, and white gas will form. Compound until reaction of gas is over.
3. To 300 lbs. of waste wash off water, add:
   a. 700 lbs. of acetone
   b. 100 lbs. of glacial acetic acid
   c. 50 lbs. of sodium chloride
   d. 25 lbs. of calcium carbonate
   e. 2.5 lbs. of boric acid
4. Follow steps 4., 5., and 6. as in Method One.

The glacial acetic acid, ammonia, and water react on the cellulose in the wood matter to form an acetated PVA which is completed by the addition of acetone to form a thick, viscous, clear binder which is a combination of acetate and original PVA.

This, with the wood matter, forms a tough plastic binder that is cured by the same methods as in Method One, with a longer cure time before set in a cold mold. The set time can be speeded up with appropriate catalyst and other compounds normally used with acetates to improve the set time.

Foamed Board Products

The following two methods can be used to produce two new foamed board products:

Method One

A blowing compound, for example glacial acetic acid, that will produce gas when reacted with another, for example soda, which will be added in step three, is added in step one in Method One above. The reaction of the blowing compounds to each other produces carbon dioxide gas which blows the wood matter and the binder matrix apart.

This method will produce a light weight foamed board, of whatever required density and weight, and can be molded in any normal molding or platen process now used by the industry, with or without heat.

Method Two

By injecting the product created in Method One into sealed molds of the desired size, and under the required pressure, and by injecting the second reaction compound into the mold with the mass just prior to entering the mold, and then sealing the mold:

1. By this method in the process of foaming or trying to foam, the gas blows the binders or resin in sufficient quantities to the outside of the mold, and forms a skin of sufficient thickness as to make an evenly balanced plastic skin around the board on all sides which requires very little sanding and very little filling, if at all.
2. The board density and thickness of the board skin can be controlled, to provide the end user with a colored and pre-filled board ready for use by the construction industry or the furniture industry.
3. This board will require little sand and filling compared to conventional particle board now used.

The four processes set forth above for producing new conventional and foamed particle boards have many unique advantages over boards presently on the market.

Example 4

Rubber Products

This example illustrates the formation of sulfur vulcanizable rubber compounds formed from the resin-salt plastic product or the mother liquor of the invention.

Rubber compounds can be produced from modification of the resin-salt plastic product, or from modification of the mother liquor produced from resins used in the starter reactants.

The starter resins, with or without the addition of salts, can be modified with a combination of acids, caustic, or ammonia compounds, and with vulcanization agents, such as sulfur, currently used in the manufacture of rubber products.

However, a formulation is used, according to the invention, that renders sulfur into a liquid that is miscible as a liquid with water or solvent compounds. Under this formulation, the sulfur does not revert back to insoluble compounds.

Sulfur-Containing Composition No. 1

By weight:
  100 parts sulfur
  25 parts glacial acetic acid
    Stir and wait for reaction to subside.
  25 parts salicylic acid (oil of wintergreen)
    Stir
  25 parts of ammonia
  Caution:
    The reaction becomes exothermic with liberation of gas. If exotherm reaches 185 degrees for 2 to 3 minutes under agitation, no further heat is required. If not, the product must be heated and held at 185 to 200 degrees, with reflux condenser, for a minimum of 3 minutes.

Sulfur-Containing Composition No. 2

By weight:
  100 parts sulfur
  25 parts glacial acetic acid
    Stir and wait for reaction to subside.
  25 parts ammonia
  Caution:
    This reaction is exothermic. Wait until it subsides and add
  10 parts caustic soda (lye) (sodium hydroxide)
  Caution:
    This reaction is very exothermic, and results in much liberation of very nauseous gas, with possible harmful effect.

After the reaction has subsided, decant into clear glass carboys.

Extract all liquid, and expose to UV light for 10 days, 2 nanometers per square inch. The exposure should be for 12 hours per day, with decreases in exposure time in relation to exponential increase in nanometers.

300 nanometers per square inch under agitation, 15 minutes exposure, in 5 gallon carboys of ½ inch thick glass, OR run through ¼ inch ID quartz tube for 3 seconds exposure at 300 nanometers.

Remove the residual sulfur, which is in the form of hard yellow-green nodules, from the first reaction, and as a yellow precipitate from the UV exposure by straining. The liquid will have separated into two distinct layers. Decant and separate the two layers. One layer is light green in color and caustic in nature, and can be used to vulcanize water systems. The other layer is light, clear amber color, is acetic, and can be used in solvent systems.

These products may be used as catalysts or vulcanizers in many systems, and may have unknown medical properties.

Example 5

Formulations with no Modifiers—Numbers 1-2

Basic Formulation #1

Base Resin-Salt Plastic with No Modifiers—Solvent System

This Basic Formulation will, in most water base, natural, or synthetic resins, produce resin-salt plastic, with the following reservations:

A. The yields are not as high as with modifications.
B. The structure of the plastic product may be new, but may not be a useful compound, or
C. The structure of the plastic product may be useful, but not economical.
D. The plastic produced is granular, and clumps together in aggregate form.
E. The plastic produced does not have as good physical properties as resin-salt plastic produced with modifiers.
F. With additional reaction, however, the resin-salt plastic compound produced may be made both new and useful, but with added costs.

Step Number
1. Mix:
  7,500# water (H2O), with or without impurities of up to 3%
  2,500# poly vinyl alcohol (PVA)
2. Add:
  7,000# Salt (NaCl)
  The salt should be added in one quick charge.
  Approximately 8,000# of white wet resin-salt reaction plastic mass is formed to be compounded, washed, and dried.

Basic Formulation #2

Base Resin-Salt Plastic With No Modifiers—Oil System

The same reservations apply to Oil Systems as to Water Systems (See Basic Formulation #1).
Step Number
1. Mix:

7,500# solvent (Xylene)

2,500# urethane resin from any commercial supplier.

Mix and heat, under agitation, to 200 degrees Fahrenheit in a closed reflux condenser.

2. Add:

7,000# Salt (NaCl)

The salt should be added in one quick charge, under agitation.

Approximately 4,200# of amber colored wet resin-salt plastic mass is formed to be compounded, washed, and dried.

After washing and squeezing with solvent acetone to remove unreacted salt, the mass will weigh approximately 3,400#.

After drying, the mass will weigh 3,000

EXAMPLE 6

Formulations with Modifiers—Numbers 3–6

Any modifiers used as examples in the following formulations numbers 3–6 are not limited to those modifiers, solvents, catalysts, inhibitors, extenders, fillers, pigments, dyes, etc. that are specifically listed.

For example, all of the following can work equally well or better, depending on the resin used, and the results sought:

Glacial acetic acid (CH3OOOH)

Acetic acid-D (CH3OOD)

Acetic D3 acid-D (CD3COOD)

Acetic anhydride (CH3C020)

Acetic anhydride-D (CD3C020)

Acetoacetic acid (CH3COCH2COOH)

Acetohydrazide (CH3CONHNH2)

Also for example:

Ammonia (H3N)

Ammonia hydroxide, 28%

Or as a combination:

Ammonium acetate (C2H7N02)

Ammonium benzoate (C7H9N02)

Ammonium borate (B4H8N207)

Basic Formulation #3

Use of Water Soluble Resins to Produce Resin-Salt Plastic

Note that, while PVA is the resin of these formulations, many water soluble acrylics, urethanes, or other resins, polymers, or copolymers, can be used in place of PVA.
Step Number
1. Mix:

7,000# water (H2O).

2,500# poly vinyl alcohol (PVA)

Mix and heat to 180 degrees Fahrenheit, until a clear solution is formed. Note that all PVA will not be in solution at this time.

The mix and heating vessel can be open kettle, open vat, or preferably a closed reflux reactor.

2. Pre-mix:

1,000# water (H2O), with or without impurities of up to 3%.

250# ammonia, 28%.

250# glacial acetic acid, 38%.

Add this to mix #1 under agitation.

Note that this mix is exothermic, and produces a white gas cloud when ammonia is added to glacial acetic acid, or when glacial acetic acid is added to ammonia.

Maintain heat at 180 degrees Fahrenheit.

3. Pre-mix and grind to 6+ micron:

7,000# salt (NaCl)

500# of calcium sulfate (CaO45)

50# of boric acid (BH303)

4. Under agitation, increase heat of Mix #1. and 2. to 205 degrees F.

Under heavy agitation, and in one fast charge, add Mix #3. above to the combined Mix of 1. and 2.

A heavy mass of white resin-salt reaction plastic forms at once, and begins to conglomerate into a solid ball.

5. Remove the mass of plastic product and place on compounding rollers which knead and squeeze out excess liquid, while at the same time, the resin-salt plastic mass is achieving a uniform consistency.

While this is being accomplished, the resin-salt plastic mass should be washed with heated water, solvents, dilute acids, or weak alkaline solutions.

Note that, regardless of the medium used, the washing which removes any unreacted salts changes the texture or feel of the plastic product. As water is the most economical, it is the preferred medium for washing.

6. As the resin-salt plastic mass is washed through the compounding rollers, the wash medium is contained for re-use.

The resin-salt plastic mass is then ready for:

A. Casting into forms for molding.

B. Extrusion into sheets or beams.

C. Forcing through spinnerettes for fibers or rods.

D. Calendering.

The molded product formed by casting (A) can be in the form of pallets, bricks, blocks, 2×4's, 2×6's, or any size building component for residential or commercial use, or into walls, flooring roofs, etc.

The products under B., C., and D, above, can be extruded under heat and pressure into a drying oven, or into a medium which will provide a set or feel to the end product. The medium used may be solvents of acetone, methyl, ethyl, ketone, or alcohols, esters, amines, alkalis, caustic solutions, acids, or bases, etc., or mixtures of one or more of the above. Each of these mediums provide a different set and feel, and impart different characteristics to the end plastic products.

4. The plastic mass can be taken from the squeeze compounding rollers and, by further compounding and drying, can be:

A. Flaked, chipped, made into pellets, extruded into rods, chopped, or ground into a powder.

B. The resin-salt plastic mass, after processing under A., can be shipped to injection molding, or extrusion companies, for manufacture into toys, ash trays, building components, TV and computer shells, or automotive parts. In fact, it can be used wherever plastic is now used for manufacturing parts or complete items, or for pipe, or for encapsulating wire or other objects of commerce.

Beginning weights for this Basic Formulation are as follows:

| Ingredient | Pounds Used | Theoretical Solids |
| --- | --- | --- |
| H2O | 7,000 | |
| PVA | 2,500 | 2,500 |
| Ammonia | 250 | |
| Glacial acetic acid | 250 | |
| Sodium chloride (salt) | 7,000 | 7,000 |
| Calcium sulfate | 500 | 500 |
| Boric acid | 50 | 50 |
| Totals | 17,550 | 10,050 |

Yields from this Basic Formulation are as follows:

| Resin-Salt Plastic mass | Pounds |
| --- | --- |
| Wet | 12,000–12,500 |
| After washing | 1,000–11,500 |
| Squeezed and dried | 9,000–9,500 |
| Wash medium (Note 1) | 2,500–3,500 |
| Residual Mother Liquor left in the reaction vessel (Note 2) | 5,000–6,000 |

Note 1—

The wash medium is now composed of 3–5% solids, and may be re-used to wash subsequent batches until a solids (unreacted salts, resin, and modifiers) content of 12–20% is achieved, at which time:

A. It may be incorporated into the next batch of resin and salt reaction, or

B. Saved and used to impregnate wood and other items that, upon drying, renders them non-flammable and insect and decay resistant.

Upon standing at room temperature in covered vessels, the wash medium grows crystals of different complexity. The crystal pattern or structure differs, depending on the modifiers used. However, the most common, with water, is a jumping jack with an extra cross member:

A six prong crystal of fine clear water white needle shaped crystalline structure. Depending on the resin and modifiers used, the fineness, color, length, and diameter of needles may vary. The drawing shown is the most common occurrence when PVA and other water soluble resins are mixed with salt (with sodium chloride as an addition).

This in no way resembles the crystalline structure of salt, boric acid, or calcium sulfate. It is possible that it has further uses and is a new and useful compound, for commercial usage in the plastic or medical field.

Note 2—

The Mother Liquor left in the reaction vessel is composed of a mixture of salts, boric acid, the resin of choice, ammonia, sodium sulfate, and H2O, with a solids content of 16–18%, upon drying. The solids content can be:

A. Raised by evaporation.

B. Raised by incorporation of more starter resin, salts, or calcium sulfate.

C. Left as is and diluted with additional water or other solvents as a starter base for another reaction mix. For example, add 3,000# of water to 5,000# of Mother Liquor. Then repeat all steps in the Basic Formulation, mixing 1,000# of this diluted Mother Liquor with the ammonia and glacial acetic acid in Step 2.

Under A. or B. of Note 2 above, the solids content of the residual Mother Liquor can be raised by evaporation or addition to a high of 90%, with the following characteristics and uses:

A. At a solids content of 18–30%, inerts, fillers, or other extenders may be mixed with it.

B. A grind of 6+ of pigment may be made by roller mill or sand mill.

C. The grind under B. may be mixed under A. in a ratio that will achieve complete hiding in one coat of paint, with other modifiers added for flow, water resistance, or other properties. It is ideal for indoor or outdoor coatings, or as a clear without pigments or dyes.

D. At high solids, it may be used as glue to manufacture particle board, or to glue sheets of paper, cloth, leather, rubber, or other materials. It may also be extruded through slit extrudes for sheet goods to be blow molded, or vacuum formed or spun through spinnerettes into many useful products.

E. It may be modified in many ways with extenders, fillers, inerts, pigments, dyes, solvents, vulcanizers, acids, plasticizers, catalysts, caustics, and many other chemicals or compounds.

F. Many waste articles, such as scrap paper, wood chips, rubber, plastics, human wastes, etc., may be incorporated with it to produce useful articles of commerce.

G. If not used as above, it may be reacted with another batch of salt to form additional batches of Plastyc.

As it is very reactive with salts, this Mother Liquor is useful as follows:

A. It can be injected into mines, or into oil, gas, and water wells, as two separate components that only react to form resin-salt plastic upon contact with each other. This allows precise control in the formation of the plastic product to seal unstable zones or zones of intrusion.

B. It can be sprayed over oil or chemical spills or other hazardous waste, followed by a second application of reactive salts to encapsulate the spill.

Example 7

Basic Formulation #4

Tupelo #1001

The Mother Liquor can be made synthetically by the following procedures:

Step Number

1. Mix:

6,500# water (H2O), with or without impurities of up to 3%.

2,500# poly vinyl alcohol (PVA), 9,000#

2. Pre-mix:

1,000# water (H2O)

250# ammonia, 28%.

250# glacial acetic acid, 38%.

1,500#

Slowly add this to mix #1 under heavy agitation. Under agitation, heat to 180 degrees fahrenheit, until a clear solution forms.

Maintain heat at 180 degrees Fahrenheit.
3. Pre-mix:
   50# boric acid
   200# calcium sulfate
   200# sodium chloride
   200# water (H2O)
   200# acetone
   100# ethylene glycol
   100# glycerine
   100# ethyl alcohol
   1,150
   11,650# Total weight
   Mix all of the above in the order of addition, and add slowly to the mixture of Steps 1 and 2. This addition should be under heavy agitation, and a heat of 205 degrees Fahrenheit. A precipitate will be formed of approximately 250# in weight, and this precipitate will be a useful plastic product.
   Remove the resin-salt plastic mass from the reactor and continue to heat for 30 minutes under medium agitation, and at a temperature of 200–205 degrees Fahrenheit.

Treat and use the removed resin-salt plastic product as you would any other plastic.

The yield is a clear heavy thixotrope weighing approximately 11,400# of 26–27% solids, and having a viscosity of 52 seconds on a #2 Zahn cup.

This synthetic Mother Liquor may be used in the same way as the original Mother Liquor, and is also the base for Formulation #1008, which is a resin-salt reaction product flame resistant up to 6,000 degrees Fahrenheit. Formulation #1008, discussed later in detail, is a PVA, sodium chloride, acrylic, urethane copolymer that will sustain up to 5 minutes of oxygen acetylene torch without burning.

This synthetic Mother Liquor can be modified by change in solvent lineup, by increasing any compound, acids, or bases, or by using vulcanizers, plasticizers, inerts, fillers, pigments, dyes, other salts, metals, acids, etc., to change the characteristics, color, or composition of Mother Liquor, or the composition of further chemical reacted products produced from the Mother Liquor.

Simple Mother Liquor Plastic

In reacting the resin and salt, a residual amount of liquid is always left that did not go to completion in the reaction process. This residual amount consists of 20–40% of the total weight of the materials used in producing the resin-salt plastic. It contains solids in the range of 12–24% of the residual, depending on the resin of choice, the modifiers used in the resin, and in the salt.

The residual liquor can be used in several ways. It can be:
1. Left in the reaction vessel for dilution and to be reacted with the next batch.
2. Removed and used with modifiers and various processes currently in common use, to be calendered, extruded, spun, blow molded, or to be made into glues, paints, or powders, and the resulting product can be used to manufacture many important articles of commerce.

The simplest formulation to produce this simple Mother Liquor synthetic is:
Step Number
1. Mix:
   7,000# water (H2O), with or without impurities of up to 3%
   2,000# poly vinyl alcohol (PVA), water soluble.
   Mix until blended.
2. Add under agitation:
   200# glacial acetic acid
   200# ammonia
   Heat all of the above to 180 degrees Fahrenheit.
3. Pre-mix and grind to 6+ micron:
   500% water (H2O)
   300# salt (sodium chloride)
   100# calcium sulfate
   20# boric acid.
4. Slowly add, under full high-speed agitation, the slurry produced in Step 3 to the mix produced by combining Steps 1 and 2.

Note that a white resin-salt plastic precipitate may form, weighing approximately 3–500 lbs. This precipitate can be removed from the batch and treated as any plastic by washing, casting, drying, etc.

This Mother Liquor synthetic will have a solids content of approximately 23%, and this can be raised by addition of other solids, modifiers, or resins that are compatible, or may also be raised by evaporation of the existing solvents.

After straining the remaining Mother Liquor, it can be used to manufacture many useful products.

Example 8

Basic Formulation #5

Use of Oil Based Resins or Copolymers to Produce Resin-Salt Plastic

Step Number
1. Mix:
   400# Toluene
   400# Xylene
   400# Naphtha
   400# Methyl ethyl ketone
   1,000# Ethyl alcohol
   500# Methanol
   500# Glycerine
   400# Ethylene glycol
   700# Ammonia
   300# Glacial acetic acid
   2,000# Water (H2O)
   7,000#

The above list is only an example. Other solvent line ups with water can be used.

Mix and, under agitation, heat to 180 degrees Fahrenheit in a closed reflux reactor. Hold temperature at 180 degrees.

2. Add:
   3,000# Resin of choice (Urethane, PVA solvent soluble, acrylic, polyester, epoxy, urea, nitrocellulose, etc., or copolymers of the above).

Continue to heat at 180 degrees, for 30 minutes under full agitation, while increasing pressure, if needed, of from room pressure to several hundred psi.

As the mix is miscible but incompatible, this liquid can remain cloudy or milky, depending on the resin used.

The order of addition of the first six items in Step 1 can be changed to reflect the resin properties; i.e. more alcohols or more hydrocarbons can be used, or other solvents or chemicals.

Pressures, and a longer reaction time at temperatures of up to 600 degrees Fahrenheit can also be used.

Depending on the resin, solvent lineup, temperature, pressure, and reaction time, the mixture may or may not become completely clear.

3. Pre-mix and grind to 6+ micron:

4,000# salt

200# calcium sulfate

10# boric acid

Under agitation and no pressure, and at a temperature of 200 degrees Fahrenheit, add to the Step 1 and 2 mixture in one fast charge.

A heavy full plastic mass of white to dark amber color will appear, having a wet weight of approximately 8,000–8,500#.

Remove this mass and place on calendering rolls for washing, kneading, and compounding with the wash solvent of choice. The wash solvent of choice depends primarily on the resin used, and should wash out unreacted compounds without solvating the resin-salt plastic.

Additional steps from the wash step forward are the same as in Basic Formulation #1, the Water Soluble Plastic Resin.

Note that the yields with oil based and some natural resins are lower, and not as much salt can be reacted. The product, however, is modified to what may be a better compound that only additional tests can determine.

The Mother Liquor can be used in the same way as the Water Based Mother Liquor for glues, sheet goods, fabric yarns, and blown or vacuum molded products.

Example 9

Basic Formulation #6

High Temperature Resistant Plastic Formulation #1008

Step Number

1. Pre-mix:

200# Flexthane 620 Exp. (an acrylic/urethane copolymer from Air Products & Chemicals)

200# Tupelo #1001 (See Basic Formulation #2, above)

2. Add:

150# Sodium chloride

Upon the addition, in one fast charge, of the sodium chloride to the Pre-mix in Step 1, a white resin-salt plastic mass forms.

Upon striping of solvents, the white resin-salt plastic mass can be formed in an open mold, or compressed in a closed mold under pressure, or dried and chipped for extrusion or injection.

When exposed to 4 cycles of 8 minutes each of microwave energy and recompressing the mass between cycles, a hard resin-salt plastic product is formed. The energy applied could be Electron Beam or conventional convection oven, microwave or UV or IR.

Upon cooling, a flame resistant resin-salt plastic is produced that will sustain the effect of 5 applications of an oxygen/acetylene torch for two minutes per cycle, with little deterioration to or burning of the resin-salt plastic product.

These Base Formulations have six things in common:

1. The incorporation of salt in an amount above 2.3% of the resulting weight.

2. The incorporation of acids, bases, or water in the resin reaction mixture prior to the salt addition.

3. A larger yield of resin-salt reaction plastic if the salt is added in one final charge rather than added slowly, whether the salt is added dry, in a slurry, or incorporated as a heavy solution.

4. Modifiers pre-mixed with the salt, either to speed up the reaction or to slow it down, or to help in the incorporation of salt into the resin of choice.

5. The use of from 0.010–30.0% ammonia with any solvent system allows a larger volume of resin to be dissolved in that system.

6. The use of from 0.010–30.0% glacial acetic acid prohibits or retards the crystallization of compounds, such as sulfur, sugar, salt, etc., that normally recrystallize at heavy solution weights.

7. A combination converts wood chemicals to form their own glue.

As can be seen from the preceding examples, with all the formulations, if water base, natural, synthetic, or oil derived resins are used, the key to producing maximum yields from the addition of salts, including but not limited to sodium chloride, is to incorporate as much water as possible into the starting reaction, in conjunction with ammonia and glacial acetic acid.

In the case of certain natural resins, such as pine resins, shellac, tars, etc., and in the case of certain oil derived resins, such as urethane, C.A.B., urea, acrylic, etc., the composition of solvent blends to achieve as much water incorporation as possible into these resins is important. To facilitate and accomplish this, the use of water miscible solvents that are compatible or semi-compatible to water and the resin of choice is important.

Increasing the amount of ammonia, or an hydrous ammonia, and glacial acetic acid facilitates the inter miscibility of resins and solvents with the addition of water into systems where this is normally not compatible.

When the resins are in a solvent system that can solvate the salts quickly, the addition of the salts in a rapid quick charge under agitation disassociates the salts into their component parts.

For example, in the case of sodium chloride, the water disassociates the salt into hydrogen, chlorine, and sodium, and the water, ammonia, and glacial acetic acid have opened up the resin chemical bonds to accept these additional building products for the creation of new and useful compounds.

All formulations can be modified in many ways by the addition of dyes, plasticizers, vulcanizers, acids, caustics, pigments, solvents, and inerts normally used in coatings or plastic formulations. These modifiers can be incorporated into the starting reaction mixture of resins or solvents, or incorporated into the salt or salt mixtures, at various strengths.

I claim:

1. A process for the production of plastic resin-salt reaction products which comprises contacting, while agitating in a reaction zone, a resin having bonding sites and being capable of accepting other ions or electrons with a salt in the presence of ammonia and an acid in a reaction medium under conditions of temperature, pressure and an amount of salt of at least 2.3 weight per cent up to 800% by weight of the resin which cause the resin to solubilize in the reaction medium and react with the salt to form the plastic resin-salt reaction product, and separating the plastic resin-salt reaction product from the reaction medium leaving a mother liquor of 15–25% solids.

2. A process according to claim 1 wherein the salt comprises at least one of alkali metal and alkaline earth metal salts and wherein substantially the entire amount of salt for reaction is combined with the resin in one charge.

3. A process according to claim 1 wherein the mother liquor is recycled to the reaction zone for further contacting and reaction with resin and salt and formation of additional amounts of plastic resin-salt reaction product.

4. A process according to claim 1 wherein the mother liquor is contacted in a second reaction zone with resin and salt to form plastic resin-salt reaction product.

5. A process according to claim 1 wherein the reaction medium is an aqueous medium and the resin is a water-soluble resin.

6. A process according to claim 1 wherein the contacting is carried out in the presence of a modifier for the resin which increases the number of bonding sites and the ratio of conversion of salt to plastic resin-salt reaction product.

7. A process according to claim 1 wherein the acid is one of glacial acetic acid, sulfuric acid or hydrochloric acid.

8. A process according to claim 6 wherein the contacting is carried out in the presence of a modifier for the salt comprising boric acid or borax and calcium carbonate to increase the rate of reaction between the resin and salt.

9. A process according to claim 1 wherein the plastic resin-salt product separated from the reaction medium is contacted with a wash liquid to remove unreacted materials and contaminants.

10. A process according to claim 1 wherein the resin is modified by treatment with one of ammonia and glacial acetic acid prior to contacting with the salt in the reaction zone.

11. A process according to claim 1 wherein the salt is modified by treatment with one of boric acid, borax, calcium carbonate or calcium sulfate prior to contacting with the resin in the reaction zone.

12. A process according to claim 1 wherein the contacting is carried out at a temperature of from about the freezing point of the reaction medium up to about 2000° F. and a pressure from below atmospheric (vacuum) up to about 10 atmospheres.

13. A process according to claim 1 wherein there is a continuous addition of salt to the reaction medium in which the resin is reacting with salt in an amount sufficient to replace the salts reacted with resin.

14. A process according to claim 5 wherein the resin is poly vinyl alcohol, the salt is sodium chloride, and the aqueous reaction medium further comprises, as modifiers, ammonia, glacial acetic acid, boric acid or borax and calcium carbonate to increase number of bonding sites and to increase the rate of reaction between the resin and salt in forming the plastic resin-salt reactor product.

15. A process according to claim 14 wherein the plastic resin-salt reaction product separated from the reaction medium is washed with a liquid to remove unreacted materials and contaminants.

16. A process according to claim 15 wherein the wash liquid comprises water.

17. A process according to claim 16 comprising the additional steps of evaporating the water wash liquid to remove water therefrom and leave a solid resin-salt product, pulverizing the solid product, and recovering the water for further use, as desired.

* * * * *